Jan. 11, 1966  J. MAURICE  3,228,503
HYDRAULIC CLUTCHES OR LIKE TRANSMISSIONS
AND IN THEIR CONTROL ELEMENTS

Filed April 5, 1962  3 Sheets-Sheet 3

INVENTOR
JEAN MAURICE
BY Irwin J. Thompson
ATTY.

United States Patent Office 3,228,503
Patented Jan. 11, 1966

3,228,503
HYDRAULIC CLUTCHES OR LIKE TRANSMISSIONS AND IN THEIR CONTROL ELEMENTS
Jean Maurice, Paris, France, assignor to Société Anonyme Francaise du Ferodo, Paris, France, a corporation of France
Filed Apr. 5, 1962, Ser. No. 185,337
Claims priority, application France, Apr. 10, 1961, 858,185
10 Claims. (Cl. 192—.096)

The present invention relates to hydraulic clutches or other transmission devices comprising a chamber connected to a source of hydraulic pressure by coupling means, in which is arranged a distributor adapted to cause selectively the engagement and disengagement of the clutch. More particularly, such clutches may be of the kind comprising two clutch plates which are coupled in rotation to the driving member of the clutch, and of which one forms a cylinder in which the other slides, the latter being formed as a piston in order to define the hydraulic chamber, and at least one friction disc intended to be gripped between the two clutch plates and being fast for rotation with the driven member of the clutch. By driving and driven members there should be understood rotating parts which may be given any form and which are not necessarily shafts, although this possibility is not to be excluded. For example, in one particularly advantageous application of such hydraulic clutches to transmissions comprising a torque converter or coupler, the driving member of the clutch may be constituted by the turbine of the said converter or coupler.

In general, hydraulic clutches of the type referred to above have certain advantages which are peculiar to them and which are well known to those skilled in the art: ease and smoothness of their hydraulic control, possibility of conjointly operating the control circuits with the circuits of the converter when so required, etc. On the other hand, these clutches have several drawbacks, one of which is that they have a residual torque in the disengaged position, or in other words a drag which prevents the desired cut-off on de-clutching from being clean and complete. This can adversely affect the gear-changing operations which are carried out at the same time as de-clutching, and there are observed, especially in the application to automobile vehicles, noises, shocks and jerks, together with difficulties of operation. In order to make the operations easier and more rapid, efforts have been made to reduce the diameter of the clutch, but such arrangements result in an increase in the number of friction discs and in actual fact do not reduce the residual torque of the clutch.

The present invention has for its object improvements in hydraulic clutches or other transmissions and in their operating elements, which eliminate these various drawbacks, providing a simple and convenient construction and at the same time permitting sure and rapid operation, free from shocks and noise.

In accordance with one of these improvements, a control which synchronizes the speeds of rotation of the driving and driven members of the hydraulic clutch is associated with the said clutch and comprises hydraulic means. More particularly, the said control comprises a device having a cylinder and/or a diaphragm for producing a modification of the speed of rotation of one of the members of the clutch, especially the driving member, in response to the action of a gate which is sensitive to the direction of the relative speed between the driving and driven members, and which is arranged in hydraulic coupling means between a source of pressure, preferably formed by the clutch chamber, and the said speed-modifying device. By virtue of an equalization or a tendency to equalization of the speeds of the two shafts, this arrangement has the effect of preventing the residual torque of the clutch in the disengaged position from resulting in shocks or excessive stresses on certain parts such as the synchronizers of the gear-box.

In one form of construction, the gates comprises two coaxial portions having communication orifices, one rigidly fixed for rotation, with a certain play, with one of the clutch shafts, and the other frictionally coupled to the other shaft and movably mounted between two abutments of the first shaft. In an alternative form, the gate is incorporated in a device for comparing two pressures derived from two points of the clutch which are close to the axis and which are connected to a point of the chamber remote from the axis, respectively by two passages in which the fluid moves at different speeds, the speed in one of the two passages being that of one of the members and in the other a speed intermediate between the speeds of the two members.

The invention has furthermore for its object, in an entirely general manner and by way of an industrial product, an apparatus for converting to fluid pressures the sense of the difference between the speeds of rotation of two parts, the said apparatus comprising two pressure-tapping points close to the axis of rotation and two passages connecting these two points to a single point remote from the axis, one of the passages being de-limited, at least partly, by walls rotating at the speed of one of the parts, while the other passage is de-limited, at least in part, by walls which rotate at the speeds of the other part.

In accordance with a further improvement of the invention, which may be adopted either separately or in combination with the first, one of the plates is fast for rotation with the driving member of the clutch, while the other plate is coupled to it in rotation through the intermediary of a castellated washer which forms at the same time an elastic clamping means for the two plates.

The various improvements, particular features and advantages of the invention will furthermore become apparent from the description which follows below of forms of embodiment selected by way of examples, reference being made to the accompanying drawings, in which.

Figure 1:
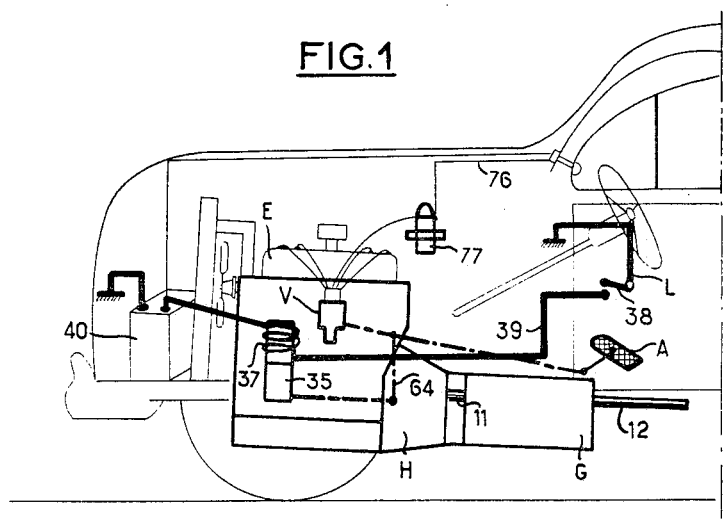
FIG. 1 is a partial diagrammatic view of an automobile vehicle provided with a transmission having a hydraulic clutch in accordance with the invention.

Reference will first be made to FIGS. 1 to 7, which relate to an application of the invention to a transmission of an automobile vehicle, comprising: a driving shaft 10 (FIG. 2) constituted by the crankshaft of an internal combustion engine E (FIG. 1) in which there is shown at A the accelerator pedal and at V the carburettor; a hydraulic torque converter H (FIG. 2), the pump of which is shown at P, the turbine at T and the reactor at R; a hydraulic clutch C acting between the turbine T and a shaft 11; and a conventional gear-box G with sliding gears and synchronizers, which in interposed between the shaft 11 and an output shaft 12 for driving the vehicle, and which provides various gear ratios selected by a gear-changing lever L (FIG. 1).

The hydraulic torque converter H (FIG. 2) has a casing 13 which is driven by the driving shaft 10 through the intermediary of a diaphragm 14, and which is rigidly fixed to the pump P. The turbine T and the reactor R define, with the pump P, a work circuit W in the interior of the casing 13. The reactor R is coupled by means of a free-wheel 15 to a fixed sleeve 16 which surrounds the shaft 11. The turbine T is fixed to a support-plate 17 of the clutch C.

The clutch C further comprises a pressure-plate 18 which is slidably engaged in a manner similar to a piston, in a cylindrical peripheral surface 19 formed in the support plate 17. In the space formed between the plates 17 and 18, and forming a clutch chamber M is arranged a friction disc 20 which is intended to be gripped between the plates 17 and 18, and which is provided with passages 21 in order that the zones of the chamber M separated by the disc, may be in constant communication with each other. The disc 20 is provided with a hub 22 fast for rotation with the shaft 11 by engagement of a collar 24 on this shaft provided with splines 23.

The plate 18 is made fixed for rotation with the plate 17 by means of a washer 25, provided with castellations on its two edges. The outer castellations 26 are engaged in mortices 28 of the plate 17, while the inner castellations 27 are engaged in mortices 29 of the plate 18. The washer 25 is elastic and is curved like a Belleville washer. It is supported against a keeper ring 28a of the cylindrical surface 19, and pushes the plate 18 towards the plate 17 while tending to grip the disc 20, that is to say to engage the clutch C.

The plate 18 is provided with one or a number of orifices 30 in order to form a communication between the chamber M and the hydraulic space F, which, inside the casing 13 is external to the chamber M and to the work circuit W of the converter. Each orifice 30 is provided with a non-return clapper 31 which permits circulation in the direction space F—chamber M with an appreciable loss of pressure, but which prevents any circulation in the opposite direction.

The clutch C is engaged when, by the action of the pump 32, there is a circulation of liquid in the direction F-M because of the loss of pressure at 30 and due to the action of the washer 25. On the other hand, the clutch C is disengaged when the pressure of the pump 32 is directed by the distributor 35 toward the chamber M, which has the effect of closing the clappers 31 and pushing back the plate 18 against the action of the washer 25 and of the pressures in the chamber F.

The hydraulic circuit which ensures the supply of the work circuit W of the converter H, and which governs the respective conditions of the pressures in the spaces F and M for the control of the clutch C, comprises (FIG. 3) a source of pressure constituted by a pump 32 supplied from a reservoir 33. The pump 32 may be the lubrication pump of the engine E and the tank 33 may be the engine oil-sump, but they could also be formed by elements separate from these latter.

Figure 2:
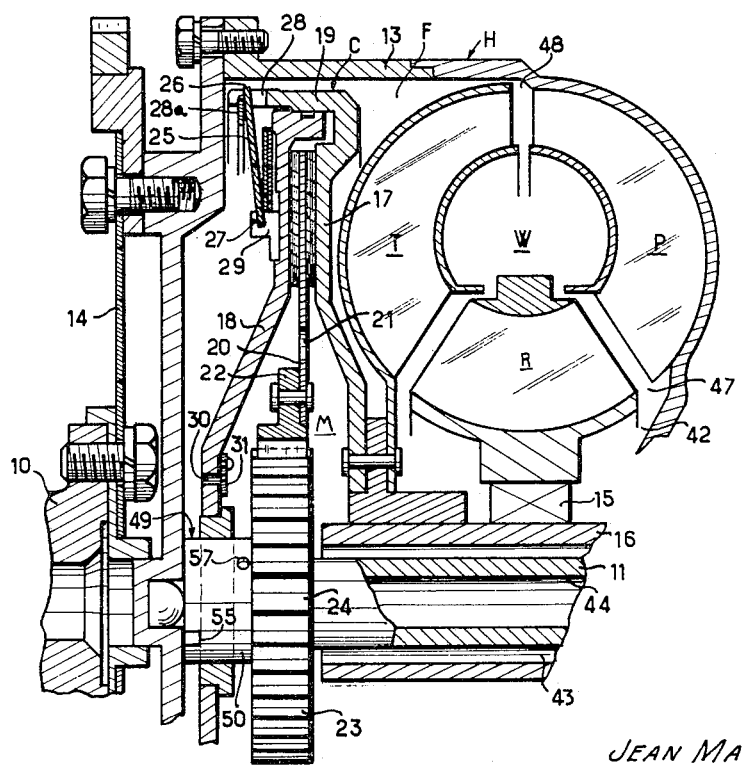
FIG. 2 is a half-view in longitudinal section of a torque converter and of the hydraulic clutch forming part of this transmission.
Figure 3:
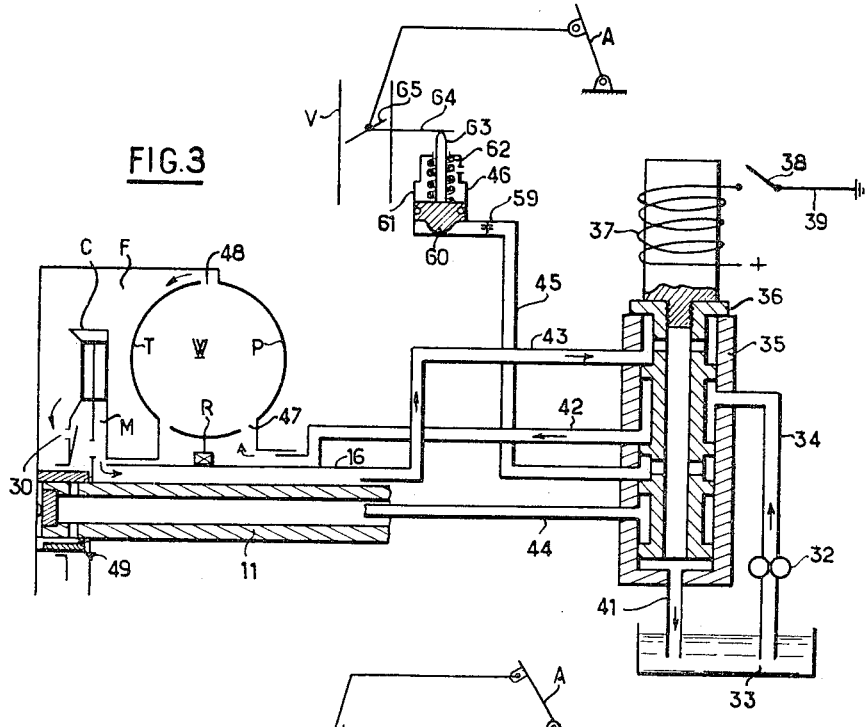
FIG. 3 is a diagram of a hydraulic control for the said clutch and of a forced-synchronization device, in the position of engagement of the clutch.
Figure 4:
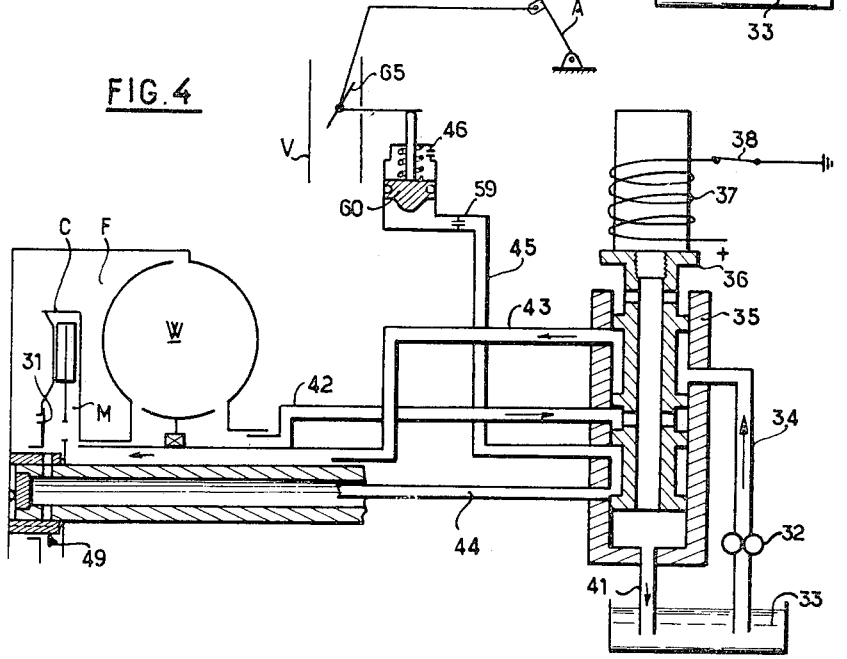
FIG. 4 is a diagram similar to that of FIG. 3, but showing the clutch in the disengaged position.
Figure 5:
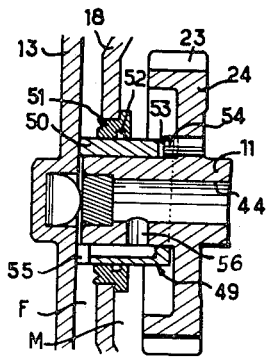
FIG. 5 is a view of an automatic synchronizing gate for the control of FIGS. 3 and 4, in longitudinal section taken along the broken line V—V of FIG. 6.

The conduit 34 leaving the pump 32, supplies a distributor 35, the slide-valve 36 of which is operated by a solenoid 37 and can take-up either the engaged position shown in FIG. 3 when a switch 38 is open, or the disengaged position shown in FIG. 4, when the switch 38 is closed. The switch 38 is arranged in a circuit 39 supplied by the battery 40 of the vehicle and comprising the solenoid 37 (FIGS. 1 and 2). It is responsive to a conditions of handling of the gear-changing level L, in such manner as to be open when the driver leaves this lever and to be closed when the driver grips the lever to change gear. The general construction of the lever L and the switch 38 may be of any appropriate type, such as for example the type described in United States Patent No. 2,846,036 showing how a switch cooperates with a gear-changing lever so as to open when the lever is released and to close when the lever is grasped.

To the distributor or electro-valve 35, there are connected the following: a general return conduit 41 to the tank 33; a conduit 42 for connection to the work chamber W, a conduit 43 for connection to the chamber M, a conduit 44 for selective connection to the chamber M or to the space F, depending on the sense of the relative speeds of the members T and 11, and a conduit 45 for connection to an atuomatic acceleration device 46 of the engine E.

The conduit 42 reaches the work chamber W by passing the fixed sleeve 16 and passing into the space 47 comprised between the reactor R and the pump P of the converter H (FIGS. 2 and 3). It should be noted that the space W communicates with the space F through the space 48 comprised between the pump P and the turbine T.

The conduit 43 reaches the chamber M by passing through the annular space included between the shaft 11 and the sleeve 16 (FIGS. 2 and 3).

Figures 6, 7:
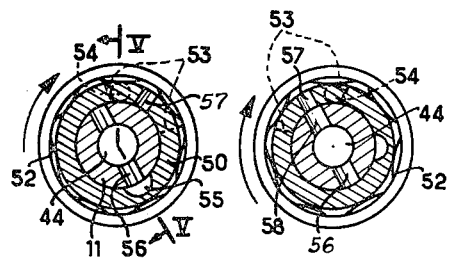
FIG. 6 is a view in transverse section of the said gate in the position at which the driving portion of the clutch is rotating faster than the driven portion.
FIG. 7 is a view similar to FIG. 6, but in the position at which the driving portion of the clutch is rotating more slowly than the driven portion.

The conduit 44 is formed in part by the bore of the shaft 11, which is made hollow and co-operates with a gate 49 (FIGS. 2, 3 and 5 to 7) which is movably mounted between a position in which it couples the conduit 44 to the space F (FIGS. 5 and 6) and a position in which the conduit 44 is connected to the chamber M (FIG. 7).

The gate 49 (FIGS. 2, 5 and 6) comprises a ring 50 which is mounted freely rotatable about the shaft 11 and which is surrounded by a bush 51 which receives the plate 18. A corrugated blade 52 acting as a spring, is arranged between the bush 51 and the ring 50, and tends by friction to drive the latter at the speed of rotation of the plate 18, that is to say, of the turbine T. The ring 50 has a slot 53 in which is engaged a stud 54 rigidly fixed to the collar 24 of the shaft 11. The stud 54 can take up two positions with respect to the slot 53, depending on the relative speed of the turbine T and the shaft 11; either the position of FIG. 6, in which the ring 50 tends to rotate faster than the shaft 11, and in which a passage 55 in the ring, connected to the space F, communicates with the conduit 44 by an orifice 56 of the shaft 11, or the position of FIG. 7, in which the ring 50 tends to rotate more slowly than the shaft 11 and in which a passage 57 in the ring 50, connected to the chamber M, communicates with the conduit 44 by a further orifice 58 in the shaft 11.

In the vicinity of the device 46, the conduit 45 has a retarding throttled portion 59, and delivers under a piston 60 which is slidably mounted in a cylinder 61 of the device 46. The piston 60, returned to its inoperative position by a spring 62, comprises a rod 63 which is coupled by a rod system 64 to the butterfly valve 65 of the carburettor V so as to cause a forced opening of the butterfly valve 65 when the conduit 45 is put under pressure.

As long as the driver does not touch the gear-changing lever L, the switch 38 is open and the electro-valve 35–36 occupies the positions shown in FIG. 3. The oil delivered from the pump 32 passes from the conduit 34 to the conduit 42 and reaches space 47, in the work circuit W, from which it passes out at 48 and passes into the space F, after which it penetrates through the orifices 30 into the chamber M, which is connected to the tank 33 by the conduits 43 and 41, so that the clutch C is engaged. The conduit 44 is closed by the slide-valve 36, and the position of the gate 49 has therefore no effect on the operation. The conduit 45 is put into communication with the tank 33, which renders the device 46 inoperative.

Whtn the driver actuates the lever L to change gear, the switch 38 closes and places the electro-valve 35–36 in the position shown in FIG. 4. The oil delivered from the pump 32 passes from the conduit 34 to the conduit 43 and, reaching the chamber M, causes an increase of pressure in this chamber, whereas the space F is connected to the tank 33 through the intermediary of the work circuit W and the conduits 42 and 41. The clappers 31 close and the clutch C becomes disengaged and permits the gear-changing operation to take place. Since during this operation the driver generally releases the accelerator pedal A, the speed of rotation of the engine falls below that of the shaft 11, and the gate 49 occupies the position shown in FIG. 7, in which the chamber M is put into communication by the orifices 57 and 58 with the conduit 44. This latter communicates through the slide-valve 36 with the conduit 45, so that the piston 60 of the device 46 lifts and causes an acceleration of the engine, which enables the plates 17 and 18 to catch-up with the speed of the disc 20. At that moment, the gate 49 occupies the position shown in FIGS. 5 and 6, and puts the conduits 45 and 44 into communication with the tank 33 through the circuit F—W—42—41, thus causing the automatic acceleration to cease. In the meantime, the new gear has been engaged and the lever L is released, which re-engages the clutch. In other words when the lever L is grasped for changing gears thus closing switch 38, the clutch C is disengaged and when the lever L is released thus opening switch 38, the clutch C is engaged.

As will be well understood, the order in which the various phases of the operation take place depends on the manner in which the vehicle is driven, on the rapidity or the slowness with which the driver changes speed, on the manner in which he delays more or less in neutral, on the more or less careful or vigorous manner of release of the accelerator pedal, on the nature of the change of gear, changing up to a higher ratio or on the contrary changing down (in general, it is in this latter case that the device of FIG. 3 will be most useful), road conditions, level, sloping-up or down, but in all cases, and as has been shown by tests, the arrangement of FIG. 3 generally permits an easier and always smoother operation, that is to say without shocks or noise.

It is to be noted that the invention is used with a hydraulic clutch C which is intended to replace the conventional clutch of automobile vehicles and with a gear-box G which can be a conventional gear-box. The clutch C when disengaged accommodates changing gears in gear-box G.

Figure 8:
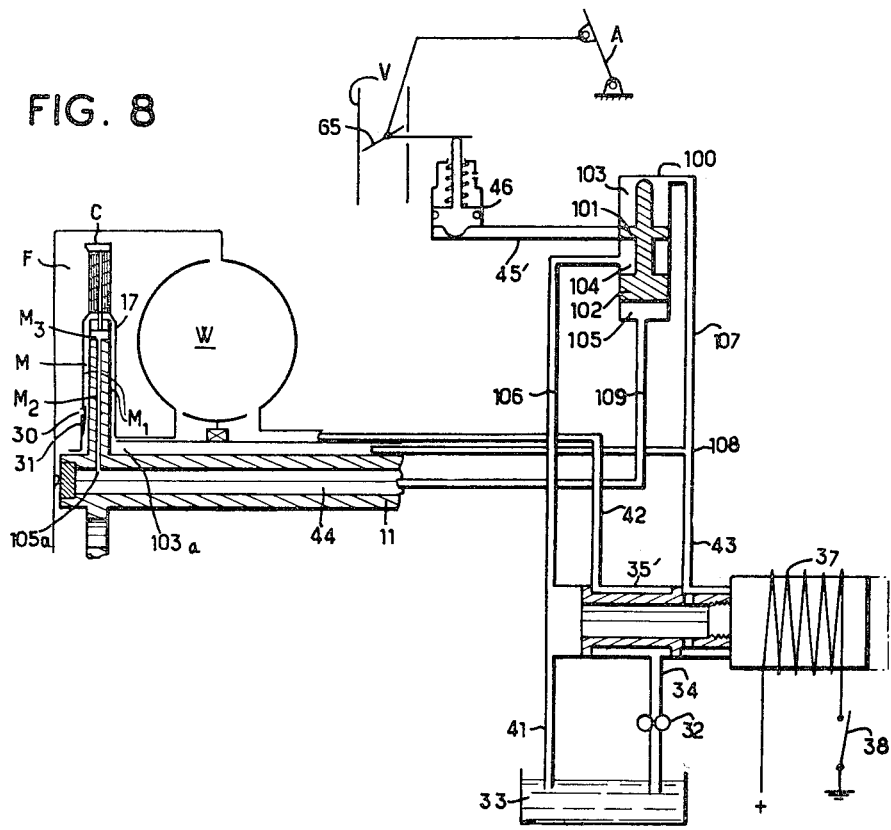
FIG. 8 is a diagram similar to that of FIG. 3, but relating to an alternative form of hydraulic control.

Reference will now be made to FIG. 8, in which the arrangement is again similar to that of FIGS. 1 to 7, but in which the actuation of the accelerator device 46 is caused, not by the gate 49 but by a device 100 which compares two pressures developed in the clutch C, the pressures being dependent on the relative speed of the shaft 11 with respect to the turbine T.

The comparison device 100 comprises a plunger with two pistons 101 and 102 which define an upper chamber 103, an intermediate chamber 104 and a lower chamber 105. The pressures to be compared are developed respectively in the end chambers 103 and 105. When the pressure in the chamber 103 is predominant, it moves the plunger 101–102 downwards and is admitted to the conduit 45' which supplies the device 46, thus causing a forced acceleration of the engine. When the pressure in the chamber 105 is predominant, it moves the plunger 101–102 upwards, which causes the conduit 45' to communicate through the intermediary of the chamber 104, with a conduit 106 which returns to the tank 33, thus rendering the device 46 inoperative.

An electro-valve 35' replaces valve 35 of the previous embodiment. There are again seen at 34, 41, 42 and 43 the conduits connected to this electro-valve. The chamber 103 of the comparison device 100 is connected by a conduit 107 at 108 to the conduit 43, while the chamber 105 is connected by a conduit 109 to the internal bore 44 of the shaft 11.

The chamber M of the clutch C has two compartments M1 and the bore M2 in the driven disc, which comprise a common portion M3 remote from the axis of the clutch, where the pressures are equal. The compartment M is defined by surfaces, of which some are fast for rotation with the shaft 11, the others being fast for rotation with the plate 17, and is connected close to the shaft at 103a to the conduit 43. The compartment M2 is defined by a bore rotating at the speed of the shaft 11, and is connected close to the axis at 105a to the conduit 44. The casing of the chamber M could be provided internally with radial guiding for the fluid in order to give this latter an angular speed close to that of the casing.

The pressures at 103a and 105a are lower than the pressure at M3, since the centrifugal effects are less marked there than at this latter point remote from the axis. The pressure drop between M3 and 105a depends only on the speed of the shaft 11, whereas the pressure drop between M3 and 103a depends both on the speed of rotation of the shaft 11 and on that of the plate 17, that is to say of the turbine T. In consequence, for a given pressure at M3, the pressure at 105a is higher than the pressure at 103a if the turbine T is rotating faster than the shaft 11, and vice versa.

When the speed of rotation of the turbine T is higher than that of the shaft 11, the pressure at the point 105a is higher than that of the point 103a, and due to the action of the comparison device 100, the device 46 is inoperative. There is no forced acceleration. On the contrary, when the speed of rotation of the turbine T is lower than that of the shaft 11, the pressure at the point 105a is less than that of the point 103a and, due to the action of the comparison device 100, the device 46 is rendered operative and causes a forced acceleration.

The constants of the whole of the apparatus are preferably chosen so that the effects of the pressures balance out when the speeds of rotation of the members T and 11 are equal.

It will of course be understood that the invention is not limited to the forms of construction described and shown, but includes all alternative forms. For example, the invention is applicable, not only to hydraulic clutches of the type shown in FIG. 2, but also to diaphragm clutches or to multi-disc clutches, and, generally speaking, to all other transmissions of appropriate types.

What I claim is:

1. A synchronizing control for the driving member and the driven member of a transmission comprising a clutch having a hydraulic chamber, comprising: a source of hydraulic pressure, a first hydraulic means for coupling said clutch chamber to said source, a distributor in said first coupling means for effecting selectively the engagement and disengagement of said clutch, a device having a hydraulic cylinder for producing a modification of the speed of rotation of one of the members of said clutch, a second hydraulic means for coupling said speed-modifying device to said source, and a gate in said second coupling means, responsive to the sense of any slip between the two members of said clutch.

2. A control as claimed in claim 1, in which said gate is disposed in said second coupling means, between the clutch chamber and said speed-modifying device.

3. A control as claimed in claim 1, in which said gate comprises two concentric portions provided with communication orifices, one fast for rotation, with play, with said driven member, the other frictionally associated with the driving member and movably mounted between two abutments of the driven member.

4. A control as claimed in claim 1, in which said gate is incorporated in a device for comparing two pressures derived from two points of the clutch which are close to the axis of said clutch and which are connected to a junction point of said clutch chamber remote from said axis, respectively by two passages, the surface of one passage rotating at the speed of one of the members and the surface of the other passage rotating in part at the speed of one of the shafts and in part at the speed of the other member.

5. A control as claimed in claim 4, in which said pressure-comparing device is movably mounted for displacement on each side of a position at which the pressures at the two points are equal.

6. A control as claimed in claim 1, in which the operation of said speed-modifying device is adapted to produce an acceleration of the speed of one of said members.

7. A control as claimed in claim 1, in which said speed-modifying device is adapted to cause either an acceleration and then a cessation of acceleration of the speed of one of said members.

8. A clutch having a rotatable drive part and a rotatable driven part, and a device for converting to fluid pressures the sense of the difference between the speeds of rotation of said two parts, said device comprising two pressure-tapping points close to the axis of rotation and two passages connecting said two points to a single point remote from said axis, one of said passages being delimited at least in part by walls rotating at the speed of one of said parts, while the other passage is delimited at least in part by walls rotating at the speed of the other said part.

9. A clutch as claimed in claim 8, in which one of said parts has the form of a disc and the other said part constitutes a casing for said disc, one of said passages being constituted by at least one channel formed in said disc, the other passage being defined by the preferably narrow spaces separating said disc from said casing, the common point being provided at the periphery of the disc in the form of a communication of said channels with said casing.

10. A clutch having a driving member and a driven member and having a hydraulic chamber comprising two clutch plates associated for rotation with the driving member of said clutch, and in which one of said plates forms a cylinder in which slides the other said plate, the latter being formed as a piston so as to define the hydraulic chamber, at least one friction disc adapted to be gripped between said two clutch plates and fast for rotation with the driven member of said clutch, one of said plates being fast for rotation with the driving member of the clutch while the other plate is coupled to said driving member through the intermediary of a castellated washer forming at the same time an elastic clamping means for the two plates, an engine driving said driving member, a carburetor for introducing fuel into the engine, a butterfly valve for controlling the quantity of gas passing through the carburetor, and means responsive to retardation of said plates relative to said friction disc to open said butterfly valve.

References Cited by the Examiner

UNITED STATES PATENTS

| 2,442,840 | 6/1948 | Carnagua | 192—3.2 X |
| 2,630,893 | 3/1953 | Misch et al. | 192—3.2 X |
| 2,630,895 | 3/1953 | McFarland | 192—3.2 X |
| 2,675,102 | 4/1954 | Robinson | 192—3.2 X |
| 2,806,568 | 9/1957 | Bliss | 192—89 X |
| 2,923,387 | 2/1960 | Brown | 192—.033 |
| 3,151,717 | 10/1964 | Kaptur et al. | 192—86 X |

FOREIGN PATENTS 648,361  7/1937  Germany.

DON A. WAITE, *Primary Examiner.*

ROBERT C. RIORDON, DAVID J. WILLIAMOWSKY,
*Examiners.*